United States Patent
Dussmann et al.

(10) Patent No.: US 11,722,207 B2
(45) Date of Patent: Aug. 8, 2023

(54) REPEATER SYSTEM USING UMBRELLA BASE STATION

(71) Applicant: CommScope Technologies LLC, Hickory, NC (US)

(72) Inventors: Alfons Dussmann, Gansheim (DE); Bogdan George Mazilu, Buchdorf (DE); Van Erick Hanson, Forest, VA (US); Gregory Allan Maca, Lynchburg, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/909,855

(22) Filed: Jun. 23, 2020

(65) Prior Publication Data

US 2021/0044347 A1    Feb. 11, 2021

Related U.S. Application Data

(60) Provisional application No. 62/883,377, filed on Aug. 6, 2019.

(51) Int. Cl.
*H04W 4/00* (2018.01)
*H04B 7/155* (2006.01)
(Continued)

(52) U.S. Cl.
CPC ....... *H04B 7/15507* (2013.01); *H04B 7/2606* (2013.01); *H04L 27/0014* (2013.01);
(Continued)

(58) Field of Classification Search
None
See application file for complete search history.

(56) References Cited

U.S. PATENT DOCUMENTS 6,005,884 A    12/1999  Cook et al.
2004/0258414 A1  12/2004  Lee
(Continued)

FOREIGN PATENT DOCUMENTS

WO    2004023830 A1    3/2004

OTHER PUBLICATIONS

International Searching Authority, "International Search Report and Written Opinion from PCT Application No. PCT/US2020/039440", from Foreign Counterpart to U.S. Appl. No. 16/909,855, filed Oct. 13, 2020, pp. 1 through 11, Published: WO.

(Continued)

*Primary Examiner* — Bob A Phunkulh
(74) *Attorney, Agent, or Firm* — Fogg & Powers LLC (57) ABSTRACT

A service-area repeater for deployment in a service area to provide capacity supplied by a base station located remotely from the service-area repeater includes downlink circuitry to receive, via a donor antenna coupled to the service-area repeater, transformed RF downlink signals transmitted from the base station or a base-station repeater, the base station transforming original RF downlink signals or the base-station repeater transforming original RF downlink signals received from the base station to produce the transformed RF downlink signals. The downlink circuitry includes a signal transformation circuit to de-transform the received transformed RF downlink signals to generate non-transformed downlink signals and a frequency correction circuit to apply a frequency correction to the downlink signals to produce corrected downlink signals. The downlink circuitry wirelessly transmits the corrected downlink signals via a coverage antenna to user equipment in the service area.

36 Claims, 3 Drawing Sheets

(51) Int. Cl.
  *H04W 84/04* (2009.01)
  *H04W 88/08* (2009.01)
  *H04B 7/26* (2006.01)
  *H04L 27/00* (2006.01)
  *H04W 16/26* (2009.01)
  *H04W 72/21* (2023.01)
  *H04W 72/23* (2023.01)

(52) U.S. Cl.
  CPC ........... *H04W 16/26* (2013.01); *H04W 72/21* (2023.01); *H04W 72/23* (2023.01); *H04W 84/047* (2013.01); *H04W 88/085* (2013.01); *H04L 2027/0026* (2013.01)

(56) References Cited

U.S. PATENT DOCUMENTS

| | | | | |
|---|---|---|---|---|
| 2009/0046624 A1* | 2/2009 | Martinez | ................ | H04H 20/59 370/319 |
| 2009/0270056 A1* | 10/2009 | Singerl | .................... | H03F 1/02 455/127.1 |
| 2010/0284446 A1* | 11/2010 | Mu | .................... | H04B 7/15521 375/211 |
| 2010/0317285 A1 | 12/2010 | Jang | | |
| 2012/0002586 A1* | 1/2012 | Gainey | .................. | H04B 1/525 370/315 |
| 2012/0142340 A1* | 6/2012 | Ofir | ........................ | H04W 48/12 455/426.1 |
| 2012/0201318 A1* | 8/2012 | Seo | ........................ | H04L 5/0023 375/260 |
| 2012/0202419 A1 | 8/2012 | O'Neill | | |
| 2013/0336202 A1* | 12/2013 | Oh | ..................... | H04B 7/15528 370/315 |
| 2015/0139345 A1* | 5/2015 | Kusunoki | ............. | H04L 5/0021 375/267 |
| 2015/0147960 A1 | 5/2015 | Hanson et al. | | |
| 2015/0207558 A1* | 7/2015 | Braz | .................. | H04B 7/15542 370/315 |
| 2016/0242130 A1* | 8/2016 | Moon | .................... | H04B 7/155 |
| 2017/0054456 A1* | 2/2017 | Mastantuono | ......... | H04B 1/005 |
| 2018/0123677 A1* | 5/2018 | Hanson | ................. | H04W 92/02 |
| 2018/0294867 A1* | 10/2018 | Schwab | ............. | H04B 7/15507 |
| 2018/0351633 A1* | 12/2018 | Birkmeir | ............. | H04W 52/143 |
| 2019/0115972 A1* | 4/2019 | Braun | ................. | H04W 24/04 |
| 2021/0368309 A1* | 11/2021 | Lupper | ................. | G08B 25/10 |

OTHER PUBLICATIONS

European Patent Office, "Partial Supplementary European Search Report", from EP Application No. 20851001.6, from Foreign Counterpart to U.S. Appl. No. 16/909,855, filed May 11, 2023, pp. 1-15, Published: EP.

* cited by examiner

REPEATER SYSTEM USING UMBRELLA BASE STATION

CROSS-REFERENCE TO RELATED APPLICATIONS

This application claims the benefit of U.S. Provisional Application Ser. No. 62/883,377, filed Aug. 6, 2019, and titled "REPEATER SYSTEM USING UMBRELLA BASE STATION," which is hereby incorporated herein by reference.

BACKGROUND

Authorities and organizations with security tasks (mission critical organizations such as, for example, fire departments or police departments) need nationally uniform digital voice and data wireless service in order to support their respective missions. Mission critical wireless service is essential and needs to be available in public buildings and certain size private buildings prior to occupancy. Public safety wireless service must not only be available outdoors, but it also needs to be available indoors (for example, within public and private buildings). Although public safety wireless service generally has lower building attenuation than, for example, commercial mobile wireless service, due to the lower frequency ranges used, the in-building public safety wireless coverage provided only using external public safety base station equipment will not be comparable to the usual in-building commercial wireless coverage. Depending on the nature of the building (reinforced concrete, metal-coated windows, etc.) and the distance to the public safety base station, the in-building public safety wireless coverage provided using this equipment will typically only cover part of the building interior. Regardless of the amount of public safety wireless capacity allocated to a given area, additional technical measures are typically required in many buildings in order to achieve sufficient public safety wireless coverage within those buildings. This is especially true if public safety wireless coverage must be ensured within the entire building.

There are several options for improving in-building coverage for public safety wireless service. One option is for a base station dedicated for providing public safety wireless service to be deployed in the relevant building. This is beneficial where, due to the size and complexity of the corresponding service area, a relatively high traffic volume is expected or where several buildings are located in close proximity (for example, airports, fairgrounds, industrial plants or the like). If necessary, the dedicated public safety base station is coupled to an existing antenna system deployed in the building (for example, an antenna system that is deployed to provide commercial wireless service) or is coupled to a separate antenna system deployed in the building specifically for public safety wireless service.

Another option is to use a direct wireless radio frequency (RF) coupling of an existing public safety base station if the base station is located near the building. In one example of this option, RF signals are fed between the public safety base station and an outdoor antenna system used for providing coverage outside of the building. The RF signals can be fed to and from the outdoor antenna system by a cable (for example, a coaxial cable). In this example, the RF signals are also fed between the base station and an in-building antenna system deployed in the building. This can be done using a directional coupler connected the cable used to couple the outdoor antenna system to the public safety base station, where another cable connects the directional coupler to the in-building antenna system deployed in the building. Almost the entire output power of the base station is supplied to the outdoor antenna system while only a fraction of the power is diverted for the in-building antenna system.

Yet another option is to use an active distribution system. Such an active distribution system includes amplifiers deployed in the building, which are connected via fiber-optic cables to a base station from which the supply signal is provided. In such a system, the direct RF coupling described above can be used to feed RF signals via a coaxial line to electro-optical converter(s) and from optical-electrical converter(s) of the active distribution system, which convert the RF signal to and from optical signals transmitted and received, respectively, via fiber-optic cables. In the building, the optical signals are converted to and from RF signals, amplified, and transmitted or received via the antenna distribution system deployed in the building.

In applications where a repeater system (such as a distributed antenna system (DAS)) is used to provide improved wireless coverage in a large area and/or for a large number of users (for example, where a DAS is used to provide improved coverage to a group of buildings), one or more base stations are often dedicated for use only with the repeater system. In such applications, several buildings are connected to a dedicated base station via an optical amplifier system (master unit). The supply signal is transported via fiber-optic cables into each respective building and fed to the respective DAS equipment deployed in that building.

One problem with some of the above described options used to provide in-building coverage for public safety wireless service relates to the high cost of fiber rental or installation if the required fiber-optic cables are not in or coupled to the buildings. One option to avoid the higher costs discussed above is to connect an off-air repeater to the dedicated base station for public safety wireless via a directional pick-up antenna. In this case, there should be at least one line of sight or, ideally, a free first Fresnel zone between the directional pick-up antenna and base-station antennas. The off-air repeater can be band-selective or channel-selective, but channel-selective repeaters are generally preferred in concentrated areas.

SUMMARY

In one example, a service-area repeater for deployment in a service area in order to provide capacity supplied by a base station located remotely from the service-area repeater in the service area is provided. The service-area repeater includes downlink circuitry configured to receive, via a donor antenna coupled to the service-area repeater, transformed radio frequency downlink signals transmitted from the base station or a base-station repeater, the base station transforming original radio frequency downlink signals or the base-station repeater transforming original radio frequency downlink signals received from the base station in order to produce the transformed radio frequency downlink signals. The downlink circuitry includes a first signal transformation circuit configured to de-transform the received transformed radio frequency downlink signals in order to generate downlink signals that are not transformed. The downlink circuitry further includes a first frequency correction circuit configured to apply a frequency correction to the downlink signals to produce corrected downlink signals. The downlink circuitry is further configured to wirelessly transmit the corrected downlink signals via a coverage antenna to any user equipment in the service area.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

If the infrastructure in a building does not allow connection to the dedicated base station for public safety wireless service via fiber-optic cable or the installation/renting of fiber is too expensive, several buildings can instead be connected to the dedicated base station via the air interface. In such examples, the dedicated base station is deployed at a suitable centralized location (for example, TV tower) to connect to multiple building distribution systems via directional antennas. These dedicated base stations are not intended to be used to provide outdoor public safety wireless service, so it is desirable to prevent outdoor user equipment from connecting to the dedicated public safety base station.

Each building has a respective pick-up repeater where the signals transmitted by the dedicated base station are received, filtered, and amplified so only the desired channels (for example, Terrestrial Trunked Radio (TETRA) channels) are distributed inside the building. The repeaters perform filtering and/or amplification in both the uplink and the downlink in this example.

One technique for preventing user equipment in the coverage area of a dedicated base station for in-building coverage from connecting to the dedicated base station includes utilizing a separation via the transmission power. In some cases, the signal from the dedicated base station for in-building public safety wireless service must be received by user equipment in an outdoor coverage area at a much lower level than the signal of other surrounding base stations. By ensuring a lower power level for signals received outdoors from the dedicated base station compared to other surrounding base stations, it is more difficult for user equipment to connect to the dedicated base station. This can be achieved, for example, by collocation of the dedicated base station with the other base stations (for example, on the same TV tower) and using a lower transmission power for the dedicated base station compared to the other base stations. Additionally, the coverage provided by the dedicated base station on the street level can be further reduced by tilting the antennas of the dedicated base station upward (away from the ground).

However, due to reflections, for example, some outdoor user equipment will still likely be able to connect to the dedicated umbrella base station even if a lower transmission power and antennas titled upward from the ground are implemented. Thus, these techniques likely cannot avoid or prevent outdoor user equipment connecting to the dedicated umbrella base stations for providing public safety wireless services in building(s).

The embodiments described herein provide systems and methods of preventing user equipment outside an intended service area from connecting to a dedicated public safety base station providing public safety wireless service for service area(s) of a public safety system. In general, the systems and methods described herein modify the transmitted umbrella base station signal in a manner such that the modified signal cannot be detected by user equipment outside the service area(s). In particular, the modified signals communicated between the base station and the directional antenna of the service area(s) cannot be detected by user equipment outside the service area because the modified signals do not comply with any mobile standard (for example, a TETRA standard). The modified signal can be picked up at the service area(s), filtered, de-modified, amplified, and distributed inside the service area(s) so that public safety mobile devices inside the service area(s) can connect to the dedicated public safety base station.

In some embodiments, the systems include signal inversion circuits at the dedicated public safety base station and at a service-area repeater in each respective service area where the public safety wireless service is provided by the dedicated public safety base station. The signal inversion circuits are configured to invert the spectrum of the signals transmitted between the base station and the service area and de-invert the spectrum of the inverted signals at the base station and the service area. In some embodiments, one or more signal inversion circuits are included in a base-station repeater coupled to the base station and configured to invert the spectrum of the downlink signals to be transmitted to the service area. In some such embodiments, the one or more signal inversion circuits included in the base-station repeater are further configured to de-invert (if applicable) the spectrum of the inverted uplink signals received from the service area prior to transmitting the uplink signals to the dedicated base station. In other embodiments, the one or more signal inversion circuits are included in the base station itself and the base-station repeater is omitted. In some such embodiments, one or more signal inversion circuits are also included in a service-area repeater coupled to a donor antenna directed toward the dedicated base station and configured to de-invert the spectrum of the inverted downlink signals received from the base station prior to radiation inside the service area. In some such embodiments, the one or more signal inversion circuits included in a service-area repeater invert uplink signals to be transmitted to the dedicated base station.

Figure 1:
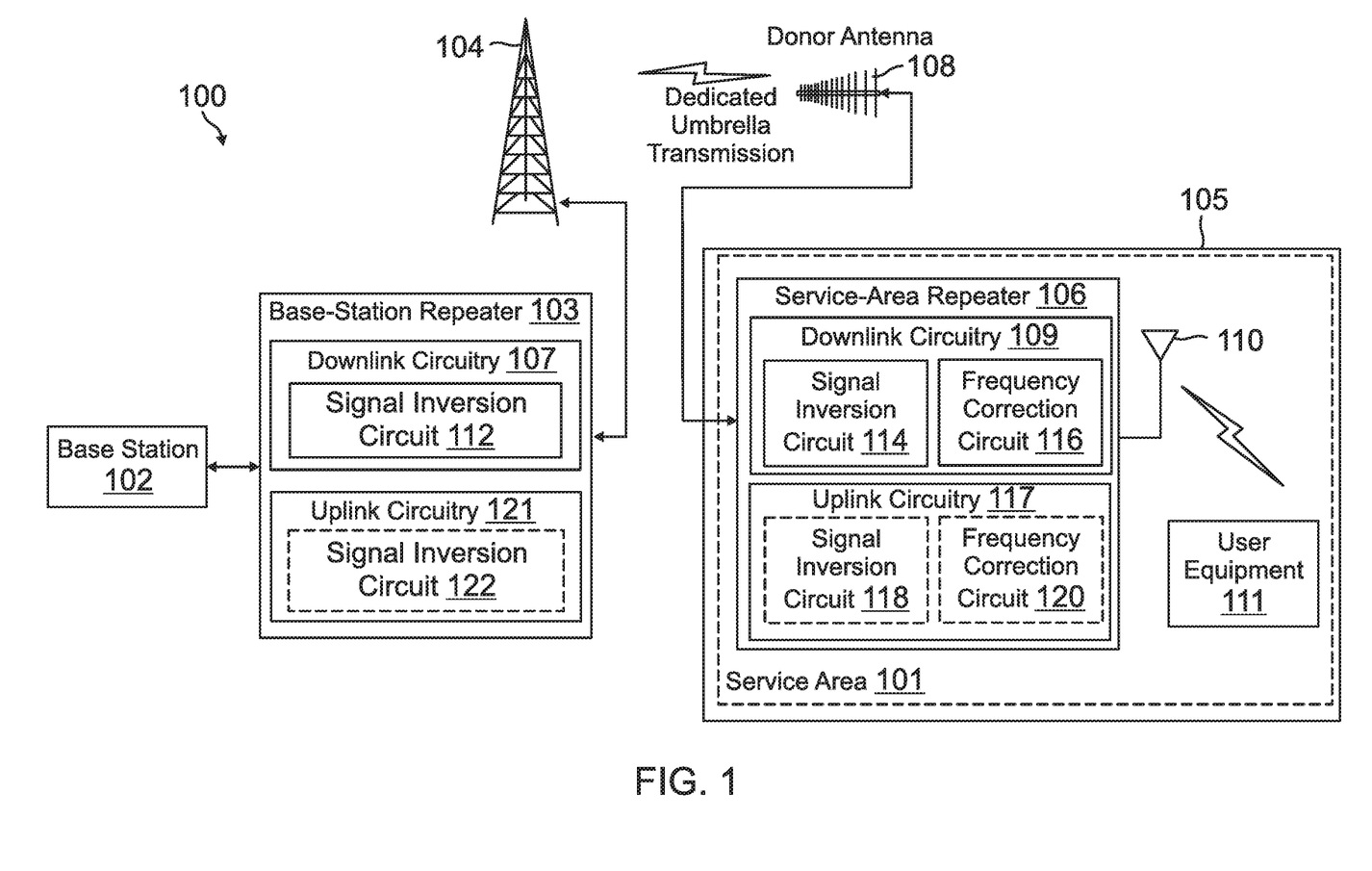
FIG. 1 is a block diagram of an example public safety system.
Figure 2:
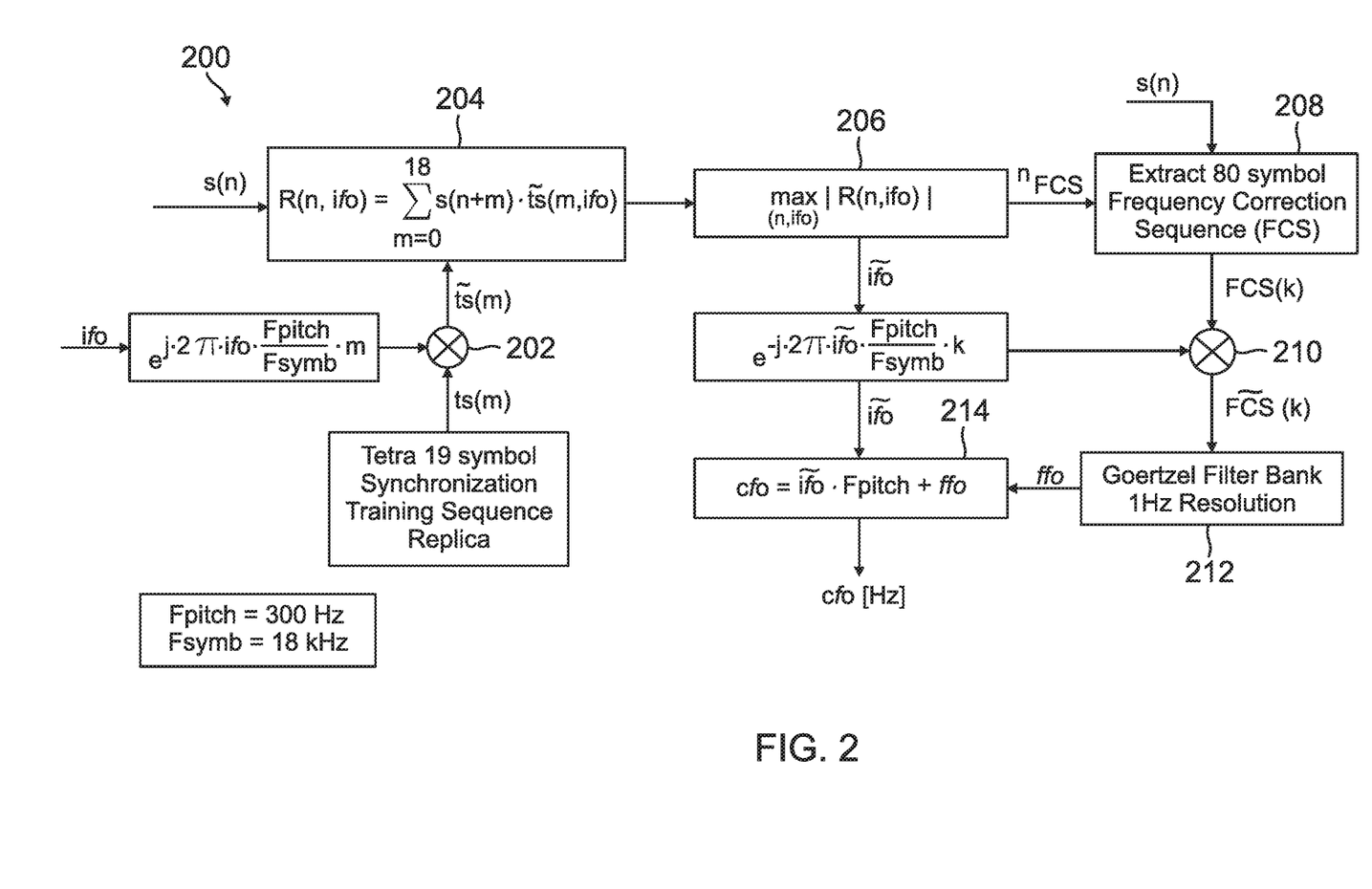
FIG. 2 is a flow diagram of an example method of determining carrier frequency offset.
Figure 3:
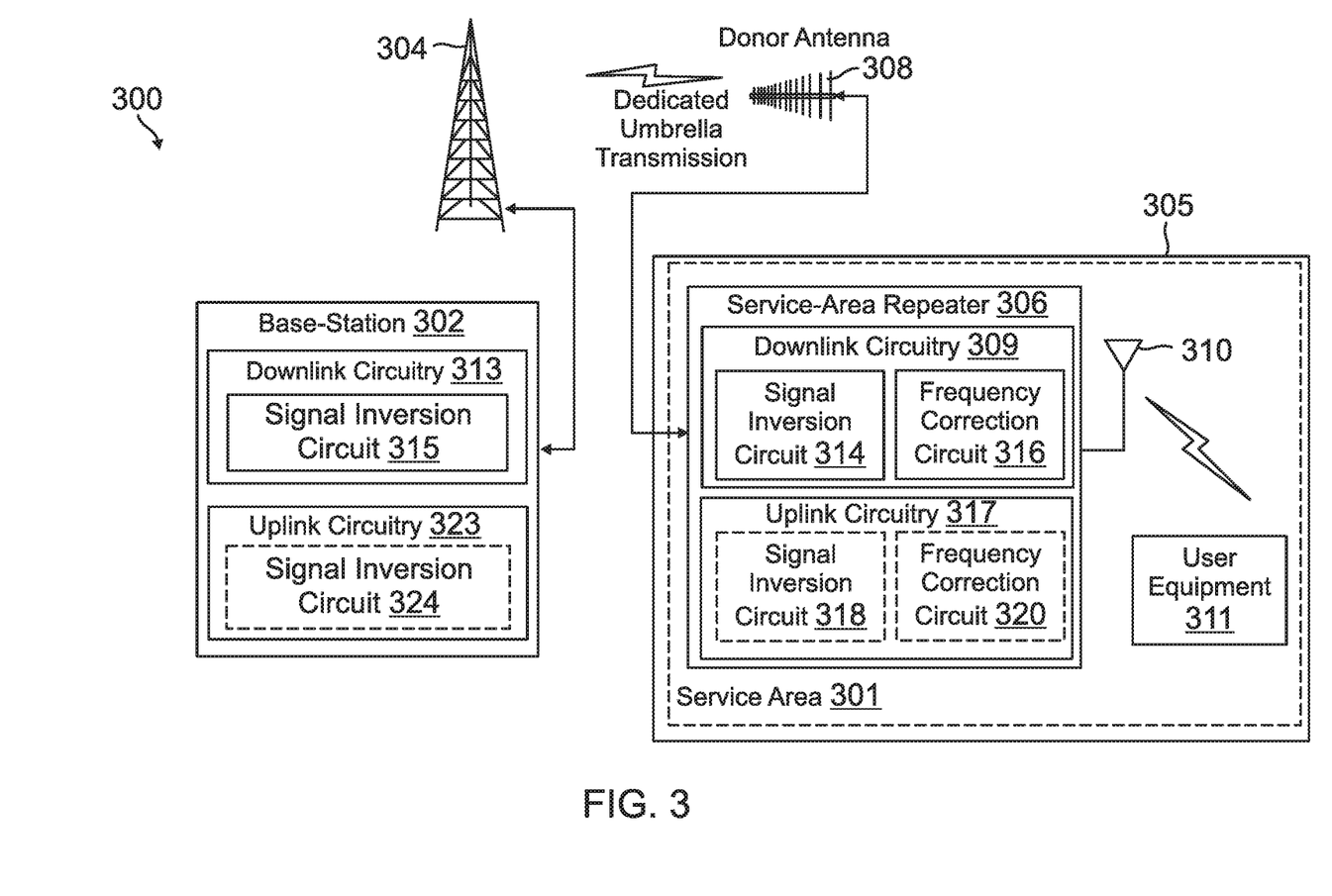
FIG. 3 is a block diagram of an example public safety system.

While the systems and method described herein with respect to FIGS. 1-3 refer specifically to signal inversion, and particularly inverting the spectrum of the radio frequency signals transmitted between the base station and the service-area repeater, it should be understood that the present application is not limited to using signal inversion and other types of signal transformation functions could also be used in addition to (or instead of) signal inversion. In particular, other functions could be used as long as the function transforms the radio frequency signals transmitted between the base station and the service-area repeater in a manner that prevents the radio frequency signals from being detected by user equipment outside the service area(s) and the transformation function is invertible such that the original signal can be recovered. The most suitable transformation functions would maintain a spectral occupancy that is similar to the original signal.

FIG. 1 is a block diagram of an example public safety system 100. In the example shown in FIG. 1, the public safety system 100 includes a base station 102 coupled to a first repeater 103. This first repeater 103 is also referred to here as the as the "base-station repeater 103." The base-station repeater 103 is communicatively coupled to one or more base-station antennas 104. It should be understood that while a single base station 102, base-station repeater 103, and base-station antenna 104 is shown, the public safety system 100 may include more than one base station 102, more than one base-station repeater 103, and/or more than one base-station antenna 104 depending on the desired capacity and coverage to be provided.

The public safety system 100 shown in FIG. 1 also includes a second repeater 106 deployed near the user equipment 111 to be served using the capacity provided by the dedicated base station 102. That is, the repeater 106 is deployed in or near a service area 101 for the user equipment 111 to be served using the capacity provided by the dedicated base station 102. This repeater 106 is also referred to here as a "service-area repeater 106." In one example, the service-area repeater 106 is deployed (at least in part) in a building 105 in which the user equipment 111 is typically located. Stated another way, the service area 101, in this example, comprises the building 105. Thus, the service-area repeater 106 can also be referred to as an "in-building repeater 106." The service-area repeater 106 is coupled to a donor antenna 108 and one or more coverage antennas 110 distributed throughout the service area 101 served by the service-area repeater 106 and the capacity provided by the dedicated base station 102. As noted above, in this example, the service area 101 served by the service-area repeater 106 comprises a building 105. While a single building 105 and service-area repeater 106 are shown, it should be understood that this is for ease of illustration. The public safety system 100 served by the dedicated base station 102 will most likely include a plurality of buildings 105, and each respective building 105 will include a respective service-area repeater 106. Further, while a single coverage antenna 110 is shown inside the building 105, it should be understood that any number of coverage antennas 110 can be deployed inside the building to provide the desired coverage. Further, the service-area repeater 106 can also serve as an RF source for an in-building distributed antenna system with a master unit and remote antenna units distributed throughout the building. In some examples, the functionality of the service-area repeater 106 can be integrated into an in-building distributed antenna system. For example, the downlink circuitry 109 and the uplink circuitry 117 shown in the service-area repeater 106 in FIG. 1 could instead be integrated into a master unit of the in-building distributed antenna system.

The dedicated base station 102 is configured to provide dedicated capacity to the user equipment 111 located in the service area 101 of the public safety system 100. In this example, the dedicated base station 102 generates a plurality of downlink signals and outputs the downlink signals via one or more interfaces. Each base station downlink signal includes one or more radio frequency channels used for communicating in the downlink direction with user equipment 111 over the relevant one or more wireless air interfaces. In some examples, the dedicated base station 102 is a dedicated Terrestrial Trunked Radio (TETRA) base station where the downlink signals output from the dedicated base station 102 comply with a TETRA standard (for example, a 3GPP or ETSI TETRA standard). In other examples, a different standard could be also used (such as, for example, a Digital Mobile Radio (DMR) standard). While the concepts described herein are particularly applicable for public safety applications, similar techniques could be used with dedicated base stations providing wireless service using other wireless standards (including, for example, other public or private safety standards, commercial wireless standards (for example, 3G, LTE, or 5G standards), using licensed or unlicensed radio frequency spectrum) to user equipment in a service area. Also, it is to be understood that the service area (and service-area repeater) may also be used to provide service within a moving vehicle (for example, a train, bus, ship, boat, or airplane).

In the example shown in FIG. 1, the base-station repeater 103 coupled to the dedicated base station 102 is configured to receive downlink signals provided by the dedicated base station 102. In some examples, the base-station repeater 103 includes an RF interface configured to receive one or more RF downlink signals from the dedicated base station 102. In some examples, the base-station repeater 103 can be configured to interface with the dedicated base station 102 using an analog RF interface (for example, either a traditional monolithic base station or via the analog RF interface of an RRH). In some examples, the base-station repeater 103 can be configured to interface with the dedicated base station 102 using a digital interface (in addition to, or instead of) interfacing with the dedicated base station 102 via an analog RF interface. For example, the base-station repeater 103 can be configured to interact directly with one or more BBUs using the digital IQ interface that is used for communicating between the BBUs and RRHs (for example, using the CPRI serial digital IQ interface).

In the example shown in FIG. 1, the base-station repeater 103 further includes downlink circuitry 107 configured to amplify the downlink signals received from the dedicated base station 102 and radiate the amplified RF downlink signals via one or more base station antennas 104 coupled to the base-station repeater 103. As a part of this process, the downlink circuitry 107 can be configured to filter the downlink signals to separate out the individual channels, individually amplify each filtered downlink channel signal, combine the individually amplified downlink channel signals, and radiate the resulting combined signal.

In some examples, the downlink circuitry 107 of the base-station repeater 103 is configured to the produce digital IQ samples from analog RF signals received by down-converting the received RF downlink signals to an intermediate frequency (IF) or to baseband, digitizing the down-converted signals to produce real digital samples, and digitally down-converting (or quadrature demodulating) the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by the dedicated base station 102. Each portion of wireless radio frequency spectrum can include, for example, a band of wireless spectrum, a sub-band of a given band of wireless spectrum, or an individual wireless carrier. In such examples, analog RF signals can be produced from the resulting inverted digital IQ samples output by the signal inversion circuit 112 (described below) by digitally up-converting the inverted digital IQ samples to produce real digital samples, performing a digital-to-analog process on the real samples in order to produce an IF or baseband analog signal, and up-converting the IF or baseband analog signal to the desired RF frequency. Analog RF signals can be produced from the resulting inverted digital IQ samples output by the signal inversion circuit 112 in other ways (for example, where the inverted digital IQ samples are provided to a quadrature digital-to-analog converter that directly produces the analog IF or baseband signal). The resulting analog RF signals can be radiated from the base-station antenna 104.

As noted above, the base-station repeater 103 also includes a signal inversion circuit 112 that is configured to invert the spectrum of the downlink signals received from the dedicated base station 102 (or data or signals produced or derived therefrom). In some examples, the base-station repeater 103 is configured to invert the spectrum of the downlink signals from the dedicated base station 102 by inverting the spectrum of a downlink baseband signal derived from the corresponding downlink signals received at the base-station repeater 103. After inverting the spectrum of the downlink baseband signal, the downlink baseband signal is upconverted to radio frequency and transmitted via the one or more base-station antennas 104. The spectrum can be inverted about any frequency, but the spectrum would generally be inverted about the carrier frequency or about 0 Hz in the case of a baseband signal. In some examples, the base-station repeater 103 further includes a frequency shifting circuit configured to shift a frequency of the inverted RF downlink signals to outside a supported frequency band of the user equipment 111.

In some examples, the signal inversion circuit 112 is configured to invert a downlink complex baseband signal having I and Q components by converting the downlink complex baseband signal to its complex conjugate. In such examples, the signal inversion circuit 112 is configured to invert either the I component or the Q component of the downlink complex baseband signal to generate an inverted downlink complex baseband signal. In other examples, the downlink baseband signal is inverted by swapping the in-phase (I) and quadrature (Q) samples of the downlink complex baseband signals.

In some examples, the signal inversion circuit 112 of the base-station repeater 103 is configured to invert the spectrum of the downlink signals from the dedicated base station 102 during down-conversion. In some examples, the signal inversion circuit 112 is configured to use high-side local oscillator injection when down-converting the RF downlink signals from the dedicated base station 102 to generate a frequency inverted lower sideband. In other examples, the signal inversion circuit 112 of the base-station repeater 103 is configured to swap the I and Q on a quadrature upconverter or downconverter.

In the example shown in FIG. 1, the service-area repeater 106 at each service area 101 is communicatively coupled to the respective donor antenna 108 at the service area 101 (for example, at the building 105). In some examples, the donor antenna 108 is positioned on the roof of the building 105. The inverted RF downlink signals are received by the service-area repeater 106 via the donor antenna 108. In some examples, the donor antenna 108 is a directional antenna 108 that is particularly configured to receive dedicated signals from the one or more base-station antennas 104 communicatively coupled to the dedicated base station 102.

In the example shown in FIG. 1, the service-area repeater 106 is configured to receive the inverted RF downlink signals via the donor antenna 108 using one or more cables. In general, the service-area repeater 106 includes downlink circuitry 109 configured to amplify (non-inverted) RF downlink signals produced by the service-area repeater 106 and radiate the amplified RF downlink signals via one or more coverage antennas 110 coupled to the service-area repeater 106 deployed in the service area 101 served by that service-area repeater 106 (that is, the building 105 in the example shown in FIG. 1). As a part of this process, the downlink circuitry 109 can be configured to filter the downlink signals to separate out the individual channels, produce non-inverted RF downlink signals for the filtered downlink channel signals, individually amplify each non-inverted RF downlink signal, combine the individually amplified non-inverted RF downlink signals, and radiate the resulting combined signal via the one or more coverage antennas 110. In examples where the base-station repeater 103 shifted the frequency of the inverted RF downlink signals to outside of a supported frequency band of the user equipment 111, the service-area repeater 106 includes a circuit configured to perform a complementary frequency shift prior to processing the signals as described above.

In some examples, the downlink circuitry 109 of the service-area repeater 106 is configured to the produce inverted digital IQ samples from inverted analog RF signals and is configured to produce (non-inverted) analog RF signals from non-inverted digital IQ samples produced by the signal inversion circuit 114 (described below) in the same general manner described above in connection with how digital IQ samples are produced from analog RF signals from the base-station repeater 103 and in connection with how analog RF signals are produced from (inverted) digital IQ samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by the dedicated base station 102. Each portion of wireless radio frequency spectrum can include, for example, a band of wireless spectrum, a sub-band of a given band of wireless spectrum, or an individual wireless carrier.

The service-area repeater 106 further includes a signal inversion circuit 114 that is configured to de-invert (or re-invert or un-invert) the spectrum of the inverted downlink signals received via the donor antenna 108 in order produce downlink signals that are not inverted. In some examples, the signal inversion circuit 114 of the service-area repeater 106 is configured to perform a complementary (or reverse) signal inversion process to the inversion process performed by the signal inversion circuit 112 of the base-station repeater 103 coupled to the dedicated base station 102 in order to "undo" the inversion process performed by the signal inversion circuit 112 of the base-station repeater 103. In this way, RF downlink signals can be provided to the user equipment 111 in the service area 101 served by the capacity provided by dedicated base station 102 (which includes the building 105 in the example shown in FIG. 1) using the desired wireless air interface complying with the appropriate wireless standard (for example, a TETRA standard). In some examples, the signal inversion circuit 114 is configured to de-invert (or re-invert or un-invert) the spectrum of the inverted downlink signals by inverting a baseband signal similarly to the manner described above with respect to signal inversion circuit 112. For example, the signal inversion circuit 114 is configured to convert a complex baseband signal to its complex conjugate or swap the I and Q samples of the inverted downlink signals. After de-inverting (or re-inverting or un-inverting) the downlink baseband signal, the downlink baseband signal is upconverted to radio frequency and transmitted via the one or more coverage antennas 110.

In some examples, the signal inversion circuit 114 of the service-area repeater 106 is configured to de-invert (or re-invert or un-invert) the spectrum of the inverted downlink RF signals from the dedicated base station 102 during down-conversion. In some examples, the signal inversion circuit 114 is configured to use high-side local oscillator injection when down-converting the inverted downlink RF signal received via the donor antenna 108 to generate a frequency inverted lower sideband. In some examples, the signal inversion circuit 114 of the service-area repeater 106 is configured to swap the I and Q on a quadrature upconverter or downconverter.

Due to the filtering, signal inversion, and/or frequency shifting described above with respect to the base-station repeater 103 and service-area repeater 106, a frequency error can be introduced into the resulting RF downlink signals that should be detected and corrected by the service-area repeater 106. Detecting and correcting the frequency error can ensure that the frequency of the dedicated umbrella base station 102 and the RF downlink signals transmitted within the service area 101 (that is, within the building 105 in the example shown in FIG. 1) to the user equipment 111 are identical to or within the limits of the required standards (for example, the 3GPP or ETSI TETRA standards). If the frequency of the RF downlink signals is not corrected prior to radiation via the one or more coverage antennas 110 in the service area 101, there is a possibility that communication between the dedicated base station 102 and the user equipment 111 would include what is perceived by the user equipment 111 to be high levels of interference or noise. Therefore, in some examples, the service-area repeater 106 includes a frequency correction circuit 116 configured to detect the frequency error and correct the frequency error in the downlink signals after the signal inversion circuit 114 of the service-area repeater 106 de-inverts (or re-inverts or un-inverts) the downlink signals.

In some examples, the frequency correction circuit 116 is configured to determine the frequency error in the downlink signals by correlating the received signals against a known pattern that is transmitted in the signal. When a correlation peak is found, the known pattern is multiplied by the complex conjugate of the correlated pattern in the received downlink signal, and the phase change of the resulting product is measured and divided by the duration of the known pattern (in time) to calculate the frequency difference between the known pattern and the received signal.

In other examples, the frequency correction circuit 116 is configured to determine the frequency error in the received downlink signals by determining the rotation rate of the constellation of the received different quadrature phase shift keying (DQPSK) signal. The rotation rate (radians/sec) is the frequency error. There are different ways of determining the rotation rate. In some examples, the input signal is modeled as:

$$x[n] = e^{j(\frac{\pi}{2}s[n]+\omega n+\phi)}$$

where s[n] is the digital signal, ω is the frequency error and φ is a constant phase term. Thus, $x^4[n]=e^{4j(\omega n+\phi)}$.

A discriminate function can be defined as:

$$\theta[n] = x^4[n](x^4[n-1])^*$$
$$= (x[n]x^*[n-1])^4$$

This simplifies to:

$$\theta[n]=e^{j4\omega}$$

In some examples, the dedicated base station 102 is a TETRA base station and configured to transmit and receive signals that comply with a TETRA standard. TETRA V+D (Voice plus Data) downlink RF carriers contain a burst called the Synchronization Burst, which is dedicated to frame synchronization and Carrier Frequency Offset (CFO) detection. The Synchronization Burst holds two special sequences. One sequence is the Synchronization Training Sequence consisting of 38 symbols, which is used for achieving frame synchronization and detection of the Synchronization Burst start. The other sequence is the Frequency Correction Sequence (FCS) consisting of 80 symbols, which generates an un-modulated tone at 2.25 kilohertz (kHz) above the nominal carrier frequency. In examples where the dedicated base station 102 is a TETRA base station, the carrier frequency offset (CFO) can be determined in a particular way shown in FIG. 2. In particular, the method 200 described herein makes use of the un-modulated tone to estimate the CFO (also referred to herein as the frequency error).

To achieve reliable frame synchronization even at higher frequency errors of the order of several kHz, the frequency correction circuit 116 in the service-area repeater 106 is configured to detect two frequency error components, which are referred to herein as an Integral Frequency Offset (IFO) and a Fractional Frequency Offset (FFO). The IFO is given by an integral number and represents the frequency error in terms of multiples of a fixed value, which is identified as Fpitch in FIG. 2. The FFO can take frequency error values between −Fpitch/2 and +Fpitch/2. The total frequency error can then be calculated as the sum of the two components: CFO=(IFO·Fpitch)+FFO.

A replica of the Synchronization Training Sequence is frequency shifted by an IFO taken from a given set of values, which results in a frequency-shifted replica of the Synchronization Training Sequence t͂s(m) (block 202). The set of IFO values used should cover the expected CFO range.

In some examples, the TETRA V+D baseband signal s(n) is correlated with the frequency-shifted replica of the Synchronization Training Sequence t͂s(m) (block 204). The results of the correlation operations are stored into a set of vectors. The set contains one vector for each IFO value considered. The length of the vectors equals the length in number of symbols of the TETRA V+D baseband signal considered.

The set of correlation vectors is analyzed for maxima (block 206). The estimated IFO if̃o corresponds to the IFO value associated with the vector in the set of vectors having the highest maximum. The offset in terms of symbols from the start of the vector to the correlation result with the highest value represents the estimated first symbol number of the Synchronization Training Sequence. Based on this symbol number, the start of the FCS $n_{FCS}$ is determined.

The method 200 includes extracting the 80 symbol FCS (block 208) and applying a frequency correction based on the estimated IFO (block 210), which provides the result to the FC$\tilde{\text{S}}$ sequence.

The IFO-corrected FCS sequence is filtered by a bank of Goertzel type filters (block 212). Each filter in the bank corresponds to an FFO value. The outputs of the filters are analyzed for maxima. The FFO corresponding to the filter with the strongest output represents the estimated FFO of the analyzed TETRA V+D signal. Based on the estimated IFO and FFO the total Carrier Frequency Offset is determined and output (block 214).

After determining the frequency error of the downlink signals, the frequency correction circuit 116 is configured to apply a frequency correction to the downlink signals to correct for the frequency error prior to radiation of the downlink signals via the one or more coverage antennas 110.

The de-inverted (or re-inverted or un-inverted) RF downlink signals are radiated in the service area 101 inside the building 105 and can be successfully received and decoded by the user equipment 111 therein. Since standard user equipment is not configured to receive and decode inverted RF downlink signals, the inverted RF signals transmitted from the one or more base-station antennas 104 cannot be successfully received and decoded by any user equipment that may be located in the coverage area of the base-station antennas 104 but not in the service area 101 of the service-area repeater 106. However, since the service-area repeaters 106 are configured to de-invert (or re-invert or un-invert) the RF downlink signals and correct the frequency error prior to radiation in the service area 101 of the service-area repeater 106, the user equipment 111 in the service area 101 (the building 105 in the example shown in FIG. 1) is able to receive and decode the RF downlink signals transmitted by the service-area repeaters 106 and connect to the dedicated base station 102.

In the example shown in FIG. 1, in the uplink, the service-area repeater 106 is configured to receive RF uplink signals from the user equipment 111 in the service area 101 via the one or more coverage antennas 110. The service-area repeater 106 includes uplink circuitry 117 configured to amplify the uplink signals received at the service-area repeater 106 and radiate the amplified uplink signals via donor antenna 108 coupled to the service-area repeater 106. As a part of this process, the uplink circuitry 117 can be configured to filter the uplink signals to separate out the individual channels, individually amplify each filtered uplink channel signal, combine the individually amplified uplink channel signals, and radiate the resulting combined signal.

In some examples, the uplink circuitry 117 of the service-area repeater 106 is configured to the produce digital IQ samples from analog RF signals in the same general manner described above in order to produce digital IQ samples from analog downlink RF signals. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by the user equipment 111 in the service area 101. Each portion of wireless radio frequency spectrum can include, for example, a band of wireless spectrum, a sub-band of a given band of wireless spectrum, or an individual wireless carrier. In such examples, analog RF signals can be produced from the resulting inverted digital IQ samples output by the signal inversion circuit 118 (described below) by digitally up-converting the inverted digital IQ samples to produce real digital samples, performing a digital-to-analog process on the real samples in order to produce an IF or baseband analog signal, and up-converting the IF or baseband analog signal to the desired RF frequency. Analog RF signals can be produced from the resulting inverted digital IQ samples output by the signal inversion circuit 118 in other ways (for example, where the inverted digital IQ samples are provided to a quadrature digital-to-analog converter that directly produces the analog IF or baseband signal). The resulting analog RF signals can be radiated from the donor antenna 108.

In some examples, the downlink path and uplink path of the service-area repeater 106 will down-convert and up-convert signals using the same local oscillator or separate local oscillators that are synchronized to the same clock. In some examples, the uplink frequency correction circuit 120 is configured to apply the complementary (or reverse) frequency correction to the uplink signals that was applied to the downlink signals by the frequency correction circuit 116.

In some examples, the uplink circuitry 117 of the service-area repeater 106 optionally includes a second signal inversion circuit 118 configured to invert the spectrum of the uplink signals received from the user equipment 111 (or data or signals produced or derived therefrom). In other examples, a single signal inversion circuit can be included in the service-area repeater 106 to perform the respective signal inversion for the downlink signals and the uplink signals. In some examples, the service-area repeater 106 is configured to invert the spectrum of the uplink signals from the user equipment 111 by inverting a baseband signal as described above. After inverting the uplink baseband signal, the inverted uplink baseband signal is upconverted to RF and transmitted via the donor antenna 108. In some examples, the service-area repeater 106 further includes a frequency shifting circuit configured to shift a frequency of the inverted RF uplink signals to outside a supported frequency band of the user equipment 111.

In some examples, the signal inversion circuit 118 is configured to invert an uplink complex baseband signal having I and Q components by converting the uplink complex baseband signal to its complex conjugate. In such examples, the signal inversion circuit 118 is configured to invert either the I component or the Q component of the uplink complex baseband signal to generate an inverted uplink complex baseband signal. In other examples, the baseband signal is inverted by swapping the in-phase (I) and quadrature (Q) samples of the uplink complex baseband signals.

In some examples, the signal inversion circuit 118 of the service-area repeater 106 is configured to invert the spectrum of the uplink signals from the user equipment 111 during down-conversion. In some examples, the signal inversion circuit 118 is configured to use high-side local oscillator injection when down-converting the RF signal from the user equipment 111 to generate a frequency inverted lower sideband. In some examples, the signal inversion circuit 118 of the service-area repeater 106 is configured to swap the I and Q on a quadrature upconverter or downconverter.

In other examples, the second signal inversion circuit 118 is omitted from the uplink circuitry 117 of the service-area repeater 106 since inversion of the uplink signals is not necessary to prevent the user equipment outside the service area 101 from connecting to the dedicated base station 102.

In the example shown in FIG. 1, in the uplink, the base-station repeater 103 communicatively coupled to the one or more base-station antennas 104 is configured to receive the inverted RF uplink signals via the one or more base-station antennas 104 using one or more cables. In general, the base-station repeater 103 includes uplink circuitry 121 configured to amplify (non-inverted) RF uplink signals produced by the base-station repeater 103 and transmit the amplified RF uplink signals to the dedicated base station 102. As a part of this process, the uplink circuitry 121 can be configured to filter the uplink signals to separate out the individual channels, produce non-inverted RF uplink signals for the filtered uplink channel signals, individually amplify each non-inverted RF uplink signal, combine the individually amplified non-inverted RF uplink signals, and transmit the resulting combined signal to the dedicated base station 102. In examples where the service-area repeater 106 shifted the frequency of the inverted RF uplink signals to outside of a supported frequency band of the user equipment 111, the base-station repeater 103 includes a circuit configured to perform a complementary frequency shift prior to processing the signals as described above.

In some examples, the uplink circuitry 121 of the base-station repeater 103 is configured to the produce inverted digital IQ samples from the inverted analog RF signals and is configured to produce (non-inverted) analog RF signals from non-inverted digital IQ samples produced by the signal inversion circuit 122 (described below) in the same general manner described above in connection with how digital IQ samples are produced from analog RF signals from the dedicated base station 102 and in connection with how (inverted) analog RF signals are produced from (inverted) digital IQ samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum to be output to the dedicated base station 102. Each portion of wireless radio frequency spectrum can include, for example, a band of wireless spectrum, a sub-band of a given band of wireless spectrum, or an individual wireless carrier.

In some examples, the uplink circuitry 121 of the base-station repeater 103 further includes a second signal inversion circuit 122 configured to de-invert (or re-invert or un-invert) the uplink signals received via the base-station antenna 104 (or data or signals produced or derived therefrom) in order to produce uplink signals that are not inverted. In other examples, a single signal inversion circuit can be included in the base-station repeater 103 to perform the respective signal inversion for the downlink signals and the uplink signals. In some examples, the signal inversion circuit 122 of the base-station repeater 103 is configured to perform a complementary (or reverse) signal inversion process to the inversion process by the signal inversion circuit 118 of the service-area repeater 106 in order to "undo" the inversion process performed by the signal inversion circuit 118 of the service-area repeater 106. In some examples, the signal inversion circuit 122 is configured to de-invert (or re-invert or un-invert) the spectrum of the inverted uplink signals by inverting an uplink baseband signal similarly to the manner described above. For example, the signal inversion circuit 122 is configured to convert an uplink complex baseband signal to its complex conjugate or swap the I and Q samples of the inverted uplink signals. After de-inverting (or re-inverting or un-inverting) the uplink baseband signal, the uplink baseband signal is upconverted to radio frequency and transmitted to the dedicated base station 102 via one or more cables.

In some examples, the signal inversion circuit 122 of the base-station repeater 103 is configured to de-invert (or re-invert or un-invert) the spectrum of the inverted uplink RF signals from the service-area repeater 106 during down-conversion. In some examples, the signal inversion circuit 122 is configured to use high-side local oscillator injection when down-converting the inverted uplink RF signal received via the one or more antennas 104 to generate a frequency inverted lower sideband. In some examples, the signal inversion circuit 122 of the base-station repeater 103 is configured to swap the I and Q on a quadrature upconverter or downconverter.

In other examples where signal inversion is not performed at the service-area repeater 106, the second signal inversion circuit 122 is omitted from the uplink circuitry 121 of the base-station repeater 103 since inversion of the uplink signals is not necessary to prevent the user equipment outside the service area 101 from connecting to the dedicated base station 102.

In some examples, further measures in addition to signal inversion can be taken to reduce the possibility that outdoor user equipment in the coverage area of the base-station antenna 104, but not in the service area 101, will connect to the dedicated base station 102. In some examples, the dedicated base station 102 is configured to transmit downlink signals at a lower power level than other base stations (for example, commercial base stations) that are collocated or near the dedicated base station 102 (for example, located on the same TV tower). In some examples, the one or more base-station antennas 104 communicatively coupled to the base station and the base-station repeater 103 are tilted upward from the ground in order to further reduce the power level of the signals from the dedicated base station 102 received at the ground level.

In some examples, a large amount of service areas 101 are serviced by the dedicated umbrella base station 102 providing public safety wireless service. For example, it could be the case that more than 100 buildings are serviced by the dedicated umbrella base station 102 providing public safety wireless service. In such examples, the uplink receiver at the dedicated base station 102 can be desensitized by the uplink noise from the service-area repeaters 106 being summed, which also limits the coverage area. To avoid this desensitization and reduce the uplink noise, additional measures can be implemented at the dedicated base station 102 and the service-area repeaters 106.

In some examples, the dedicated base station 102 can include multiple uplink receivers where only a sub-set of the multiple service-area repeaters 106 are connected to one uplink receiver (for example, 20 out of 100 total service-area repeaters). Alternatively, or in addition to including multiple uplink receivers at the dedicated base station 102, the uplink circuitry 117 of the service-area repeaters 106 can include an uplink muting/squelch circuit in order to limit the noise floor at the uplink receiver(s) of the dedicated base station 102. In some examples, the uplink muting/squelch circuit is configured to detect a power level of the uplink signals. When the power level of the uplink signals for the respective service-area repeater 106 is below a threshold, it can be assumed that there is no traffic for the respective service-area repeater 106 and the muting/squelch circuit is configured to reduce the gain of the service-area repeater 106 (for example, 10 dB to 30 dB). This limits the uplink noise power for the respective service-area repeater 106 and overall noise floor at the dedicated base station 102. In some examples, the uplink muting described above can be performed in a manner that is broadband, channel-selective, or even on a time-slot basis depending on the desired performance.

FIG. 3 is a block diagram of another example public safety system 300. In the example shown in FIG. 3, the public safety system 300 includes a base station 302 communicatively coupled to one or more base-station antennas 304. The public safety system 300 shown in FIG. 3 also includes a repeater 306 deployed near the user equipment 311 to be served using the capacity provided by the dedicated base station 302. That is, the repeater 306 is deployed in or near a service area 301 for the user equipment 311 to be served using the capacity provided by the dedicated base station 302. This repeater 306 is also referred to here as a "service-area repeater 306." In one example, the service-area repeater 306 is deployed (at least in part) in a building 305 in which the user equipment 311 is typically located. Stated another way, the service area 301, in this example, comprises the building 305. Thus, the service-area repeater 306 can also be referred to as an "in-building repeater 306." The service-area repeater 306 is coupled to a donor antenna 308 and one or more coverage antennas 310 distributed throughout the service area 301 served by the service-area repeater 306 and the capacity provided by the dedicated base station 302. As noted above, in this example, the service area 301 served by the service-area repeater 306 comprises a building 305. While a single building 305 and service-area repeater 306 are shown, it should be understood that this is for ease of illustration. The public safety system 300 served by the dedicated base station 302 will most likely include a plurality of buildings, and each building will include a respective service-area repeater 306. Further, while a single coverage antenna 310 is shown inside the building 305, it should be understood that any number of coverage antennas 310 can be deployed inside the building to provide the desired coverage. Further, the service-area repeater 306 can also serve as an RF source for an in-building distributed antenna system with a master unit and remote antenna units distributed throughout the building. In some examples, the functionality of the service-area repeater 306 can be integrated into an in-building distributed antenna system. For example, the downlink circuitry 309 and the uplink circuitry 317 shown in the service-area repeater 306 in FIG. 3 could instead be integrated into a master unit of the in-building distributed antenna system.

The functions, structures, and other description of common elements of the public safety system discussed above with respect to FIGS. 1-2 are also applicable to like named features in public safety system 300 shown in FIG. 3 and vice versa. Further, like named features included in FIGS. 1 and 3 are numbered similarly. The description of FIG. 3 will focus on the differences from FIG. 1.

The public safety system 300 shown in FIG. 3 does not include a base-station repeater coupled to the dedicated base station 302 to perform signal inversion as shown in and described with respect to FIG. 1. Instead, in the example shown in FIG. 3, the dedicated base station 302 includes downlink circuitry 313 that includes a signal inversion circuit 315 configured to invert the spectrum of the downlink signals prior to transmission to the service-area repeater 306. In some examples, the signal inversion circuit 315 is configured to invert the spectrum of the downlink signals by inverting a downlink baseband signal. In some examples, the signal inversion circuit 315 of the base station 302 is configured to invert a downlink complex baseband signal having I and Q components by converting the downlink complex baseband signal to its complex conjugate. In such examples, the signal inversion circuit 315 is configured to invert either the I component or the Q component of the downlink complex baseband signal to generate an inverted downlink complex baseband signal. In other examples, the downlink baseband signal is inverted by swapping the in-phase (I) and quadrature (Q) samples of the downlink complex baseband signals. After inverting the downlink baseband signal, the inverted downlink baseband signal is upconverted to radio frequency and transmitted via the one or more base-station antennas 304. In some examples, the dedicated base station 302 further includes a frequency shifting circuit configured to shift a frequency of the inverted RF downlink signals to outside a supported frequency band of the user equipment 311.

The service-area repeater 306 operates in the same manner as service-area repeater 106 described above with respect to FIGS. 1-2.

In some examples, the dedicated base station 302 includes uplink circuitry 323 configured to the produce inverted digital IQ samples from the inverted analog RF signals and is configured to produce (non-inverted) analog RF signals from non-inverted digital IQ samples produced by the signal inversion circuit 324 (described below) in the same general manner described above in connection with how digital IQ samples are produced by the dedicated base station 302 and in connection with how (inverted) analog RF signals are produced from (inverted) digital IQ samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum. Each portion of wireless radio frequency spectrum can include, for example, a band of wireless spectrum, a sub-band of a given band of wireless spectrum, or an individual wireless carrier.

In some examples, the uplink circuitry 323 of the dedicated base station 302 further includes a second signal inversion circuit 324 configured to de-invert (or re-invert or un-invert) the uplink signals received via the base-station antenna 304 (or data or signals produced or derived therefrom) in order to produce uplink signals that are not inverted. In other examples, a single signal inversion circuit can be included in the dedicated base station 302 to perform the respective signal inversion for the downlink signals and the uplink signals. In some examples, the signal inversion circuit 324 of the dedicated base station 302 is configured to perform a complementary (or reverse) signal inversion process to the inversion process by the signal inversion circuit 318 of the service-area repeater 306 in order to "undo" the inversion process performed by the signal inversion circuit 318 of the service-area repeater 306. In some examples, the second signal inversion circuit 324 is configured to de-invert (or re-invert or un-invert) the spectrum of the inverted uplink signals by inverting an uplink baseband signal similarly to the manner described above. For example, the second signal inversion circuit 324 is configured to convert an uplink complex baseband signal to its complex conjugate or swap the I and Q samples of the inverted uplink signals. After de-inverting (or re-inverting or un-inverting) the uplink baseband signal, the uplink baseband signal is further processed by dedicated base station 302.

In some examples, the second signal inversion circuit 324 of the dedicated base station 302 is configured to de-invert (or re-invert or un-invert) the spectrum of the inverted uplink RF signals from the service-area repeater 306 during down-conversion. In some examples, the second signal inversion circuit 324 is configured to use high-side local oscillator injection when down-converting the inverted uplink RF signal received via the one or more antennas 304. In some examples, the signal inversion circuit 324 of the base station 302 is configured to swap the I and Q on a quadrature upconverter or downconverter.

In some examples, the signal inversion circuit 318 is omitted from the uplink circuitry 317 of the service-area repeater 306 since inversion of the uplink signals is not necessary to prevent the user equipment outside the service area 301 from connecting to the dedicated base station 302. In such examples where signal inversion is not performed at the service-area repeater 306, the second signal inversion circuit 324 is omitted from the uplink circuitry 323 of the base station 302 since inversion of the uplink signals is not necessary to prevent the user equipment outside the service area 301 from connecting to the dedicated base station 302.

In some examples, further measures in addition to signal inversion can be taken to reduce the possibility that outdoor user equipment in the coverage area of the base-station antenna 304, but not in the service area 301, will connect to the dedicated base station 302. In some examples, the dedicated base station 302 is configured to transmit downlink signals at a lower power level than other base stations (for example, commercial base stations) that are collocated or near the dedicated base station 302 (for example, located on the same TV tower). In some examples, the one or more base-station antennas 304 communicatively coupled to the base station 302 are tilted upward from the ground in order to further reduce the power level of the signals from the dedicated base station 302 received at the ground level.

In some examples, the dedicated base station 302 can include multiple uplink receivers where only a sub-set of the multiple service-area repeaters 306 are connected to one receiver (for example, 20 out of 100 total service-area repeaters). Alternatively, or in addition to multiple uplink receivers at the dedicated base station 302, the uplink circuitry 317 of the service-area repeaters 306 can include an uplink muting/squelch circuit in order to limit the noise floor at the uplink receiver(s) of the dedicated base station 302. In some examples, the uplink muting/squelch circuit is configured to detect a power level of the uplink signals. When the power level of the uplink signals for the respective service-area repeater 306 is below a threshold, it can be assumed that there is no traffic for the respective service-area repeater 306 and the muting/squelch circuit is configured to reduce the gain of the service-area repeater 306 (for example, 10 dB to 30 dB). This limits the uplink noise power for the respective service-area repeater 306 and overall noise floor at the dedicated base station 302. In some examples, the uplink muting described above can be performed in a manner that is broadband, channel-selective, or even on a time-slot basis depending on the desired performance.

In various aspects, system elements, method steps, or examples described throughout this disclosure (such as the repeaters, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a service-area repeater for deployment in a service area in order to provide capacity supplied by a base station located remotely from the service-area repeater in the service area, the service-area repeater comprising: downlink circuitry configured to receive, via a donor antenna coupled to the service-area repeater, transformed radio frequency downlink signals transmitted from the base station or a base-station repeater, the base station transforming original radio frequency downlink signals or the base-station repeater transforming original radio frequency downlink signals received from the base station in order to produce the transformed radio frequency downlink signals that cannot be detected by user equipment outside the service area; wherein the downlink circuitry comprises a first signal transformation circuit configured to de-transform the received transformed radio frequency downlink signals in order to generate downlink signals that are not transformed; wherein the downlink circuitry further comprises a first frequency correction circuit configured to apply a frequency correction to the downlink signals to produce corrected downlink signals; and wherein the downlink circuitry is further configured to wirelessly transmit the downlink signals via a coverage antenna to any user equipment in the service area.

Example 2 includes the service-area repeater of Example 1, wherein the service-area repeater is configured to transmit the corrected downlink signals via the coverage antenna to any user equipment using an air interface complying with a Terrestrial Trunked Radio (TETRA) standard.

Example 3 includes the service-area repeater of any of Examples 1-2, wherein the service-area repeater further comprises uplink circuitry configured to receive, via the coverage antenna, radio frequency uplink signals from user equipment in the service area, wherein the uplink circuitry is further configured to wirelessly transmit the uplink signals via the donor antenna to the base station.

Example 4 includes the service-area repeater of Example 3, wherein the uplink circuitry comprises a second signal transformation circuit configured to transform the received radio frequency uplink signals to generate transformed uplink signals, wherein the uplink circuitry further comprises a second frequency correction circuit configured to apply the frequency correction to the transformed uplink signals to generate corrected transformed uplink signals, wherein the uplink circuitry is further configured to wirelessly transmit the corrected transformed uplink signals via the donor antenna to the base station.

Example 5 includes the service-area repeater of Example 4, wherein the first signal transformation circuit and the second signal transformation circuit are the same circuit.

Example 6 includes the service-area repeater of Example 4, wherein the first frequency correction circuit and the second frequency correction circuit are the same circuit.

Example 7 includes the service-area repeater of any of Examples 3-6, wherein the downlink circuitry further comprises a first frequency shifting circuit configured to shift a frequency of the downlink signals to a supported frequency band of the user equipment, wherein the uplink circuitry further comprises a second frequency shifting circuit configured to shift a frequency of the uplink signals to outside a supported frequency band of the user equipment.

Example 8 includes the service-area repeater of any of Examples 3-7, wherein the uplink circuitry further comprises an uplink muting circuit configured to selectively mute a band, channel, and/or time-slot of the received radio frequency uplink signals.

Example 9 includes the service-area repeater of any of Examples 1-8, wherein the received transformed radio frequency downlink signals are inverted radio frequency downlink signals, wherein the first signal transformation circuit is a first signal inversion circuit configured to de-invert a spectrum of the received transformed radio frequency downlink signals in order to generate downlink signals that are not inverted.

Example 10 includes the service-area repeater of Example 9, wherein the first signal transformation circuit is configured to de-invert the spectrum of the received inverted radio frequency downlink signals by: downconverting the inverted radio frequency downlink signals to an inverted complex baseband signal having an in-phase component and a quadrature component; swapping the in-phase component and the quadrature component of the inverted complex baseband signal to generate a non-inverted complex baseband signal; and upconverting the non-inverted complex baseband signal to generate the downlink signals that are not inverted.

Example 11 includes the service-area repeater of Example 9, wherein the first signal inversion circuit is configured to de-invert the spectrum of the received inverted radio frequency downlink signals by: downconverting the inverted radio frequency downlink signals to an inverted complex baseband signal having an in-phase component and a quadrature component; inverting the in-phase component or the quadrature component of the inverted complex baseband signal to generate a non-inverted complex baseband signal; and upconverting the non-inverted complex baseband signal to generate the downlink signals that are not inverted.

Example 12 includes the service-area repeater of Example 9, wherein the first signal inversion circuit is configured to de-invert the spectrum of the received inverted radio frequency downlink signals by: downconverting the inverted radio frequency downlink signals using a high-side local oscillator injection in order to generate a frequency inverted lower sideband; and converting the frequency inverted lower sideband to radio frequency in order to generate the downlink signals that are not inverted.

Example 13 includes the service-area repeater of any of Examples 1-12, wherein the first frequency correction circuit is configured to determine the frequency correction by: correlating the received transformed radio frequency downlink signals against a known pattern that is transmitted in the received signal; multiplying the known pattern by a complex conjugate of the correlated pattern in the received signal; measuring a phase change of the resulting product; and dividing by a duration of the known pattern to calculate the frequency difference between the known pattern and the received signal.

Example 14 includes the service-area repeater of any of Examples 1-13, wherein the transformed radio frequency downlink signals are modulated using differential quadrature phase shift keying, wherein the first frequency correction circuit is configured to determine the frequency correction by determining a rotation rate of a constellation of the received transformed radio frequency downlink signals.

Example 15 includes the service-area repeater of any of Examples 1-14, wherein the first frequency correction circuit is configured to determine the frequency correction by determining a carrier frequency offset using a synchronization burst of a Terrestrial Trunked Radio (TETRA) signal.

Example 16 includes a base-station repeater for deployment with a base station configured to supply capacity for serving a service area that is located remotely from the base station and the base-station repeater, the base-station repeater comprising: downlink circuitry configured to receive downlink signals from the base station; wherein the downlink circuitry comprises a first signal transformation circuit configured to transform the received downlink signals in order to generate transformed downlink signals that cannot be detected by user equipment outside the service area; and wherein the downlink circuitry is further configured to wirelessly transmit the transformed downlink signals via one or more antennas to a service-area repeater located in the service area.

Example 17 includes the base-station repeater of Example 16, wherein the first signal transformation circuit is configured to transform the received downlink signals by inverting a spectrum of the received downlink signals.

Example 18 includes the base-station repeater of any of Examples 16-17, wherein the downlink signals received from the base station are digital downlink signals.

Example 19 includes the base-station repeater of any of Examples 16-17, wherein the downlink signals received from the base station are radio frequency downlink signals.

Example 20 includes the base-station repeater of Example 19, wherein the first signal transformation circuit is configured to generate the transformed downlink signals by: downconverting the received radio frequency downlink signals to a complex baseband signal having an in-phase component and a quadrature component; swapping the in-phase component and the quadrature component of the complex baseband signal to generate an inverted complex baseband signal; and upconverting the inverted complex baseband signal to generate inverted downlink signals.

Example 21 includes the base-station repeater of Example 19, wherein the first signal transformation circuit is configured to generate the transformed downlink signals by: downconverting the received radio frequency downlink signals to a complex baseband signal having an in-phase component and a quadrature component; inverting the in-phase component or the quadrature component of the complex baseband signal to generate an inverted complex baseband signal; and upconverting the inverted complex baseband signal to generate inverted downlink signals.

Example 22 includes the base-station repeater of Example 19, wherein the first signal transformation circuit is configured to generate the transformed downlink signals by: downconverting the received radio frequency downlink signals using a high-side local oscillator injection to generate a frequency inverted lower sideband; and converting the frequency inverted lower sideband to a radio frequency signal to generate inverted downlink signals.

Example 23 includes the base-station repeater of any of Examples 16-22, further comprising uplink circuitry configured to receive, via the one or more antennas, radio frequency uplink signals, wherein the uplink circuitry is further configured to transmit uplink signals derived from the radio frequency uplink signals to the base station.

Example 24 includes the base-station repeater of Example 23, wherein the uplink circuitry is configured to receive transformed radio frequency uplink signals, wherein the uplink circuitry comprises a second signal transformation circuit configured to de-transform the received transformed radio frequency uplink signals in order to generate uplink signals that are not transformed.

Example 25 includes the base-station repeater of any of Examples 23-24, wherein the downlink circuitry further comprises a first frequency shifting circuit configured to shift a frequency of the downlink signals to outside a supported frequency band of the user equipment, wherein the uplink circuitry further comprises a second frequency shifting circuit configured to shift a frequency of the received uplink signals to a supported frequency band of the user equipment.

Example 26 includes a base station configured to supply capacity for serving a service area that is located remotely from the base station, comprising: downlink circuitry configured to generate downlink signals; the downlink circuitry further comprising a first signal transformation circuit configured to transform the downlink signals to generate transformed downlink signals that cannot be detected by user equipment outside the service area; and wherein the downlink circuitry is configured to wirelessly transmit the transformed downlink signals via one or more antennas to the service area.

Example 27 includes the base station of Example 26, wherein the first signal transformation circuit is configured to transform the downlink signals by inverting a spectrum of the downlink signals.

Example 28 includes the base station of any of Examples 26-27, wherein the base station comprises a Terrestrial Trunked Radio (TETRA) base station.

Example 29 includes the base station of any of Examples 26-28, wherein the one or more antennas are tilted upward away from the ground.

Example 30 includes the base station of any of Examples 26-29, wherein the first signal transformation circuit is configured to generate the transformed radio frequency downlink signals by: swapping an in-phase component and a quadrature component of a complex baseband signal to generate an inverted complex baseband signal; and upconverting the inverted complex baseband signal to generate the inverted radio frequency downlink signals.

Example 31 includes the base station of any of Examples 26-29, wherein the first signal transformation circuit is configured to generate the transformed radio frequency downlink signals by: inverting an in-phase component or a quadrature component of a complex baseband signal to generate an inverted complex baseband signal; and upconverting the inverted complex baseband signal to generate the inverted radio frequency downlink signals.

Example 32 includes the base station of any of Examples 26-29, wherein the base station comprises a plurality of uplink receivers configured to receive radio frequency uplink signals from user equipment inside a plurality of buildings.

Example 33 includes the base station of any of Examples 26-32, further comprising uplink circuitry configured to receive, via the one or more antennas, radio frequency uplink signals.

Example 34 includes the base station of Example 33, wherein the uplink circuitry is configured to receive transformed radio frequency uplink signals, wherein the uplink circuitry comprises a second signal transformation circuit configured to de-transform the received transformed radio frequency uplink signals in order to generate uplink signals that are not transformed.

Example 35 includes the base station of Example 34, wherein the downlink circuitry further comprises a first frequency shifting circuit configured to shift a frequency of the transformed radio frequency downlink signals, wherein the uplink circuitry further comprises a second frequency shifting circuit configured to shift a frequency of the received uplink signals.

Example 36 includes the base station of Example 35, wherein the first frequency shifting circuit is configured to shift the frequency of the inverted radio frequency downlink signals to outside a supported frequency band of user equipment, wherein the second frequency shifting circuit is configured to shift the frequency of the received uplink signals to a supported frequency band of the user equipment.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A service-area repeater for deployment in a service area in order to provide capacity supplied by a base station located remotely from the service-area repeater in the service area, the service-area repeater comprising:
   downlink circuitry configured to receive, via a donor antenna coupled to the service-area repeater, transformed radio frequency downlink signals transmitted from the base station or a base-station repeater, the base station transforming original radio frequency downlink signals or the base-station repeater transforming original radio frequency downlink signals received from the base station in order to produce the transformed radio frequency downlink signals that cannot be detected by user equipment outside the service area;

wherein the downlink circuitry comprises a first signal transformation circuit configured to de-transform the received transformed radio frequency downlink signals in order to generate downlink signals that are not transformed;

wherein the downlink circuitry further comprises a first frequency correction circuit configured to apply a frequency correction to the downlink signals to produce corrected downlink signals; and wherein the downlink circuitry is further configured to wirelessly transmit the downlink signals via a coverage antenna to any user equipment in the service area.

2. The service-area repeater of claim 1, wherein the service-area repeater is configured to transmit the corrected downlink signals via the coverage antenna to any user equipment using an air interface complying with a Terrestrial Trunked Radio (TETRA) standard.

3. The service-area repeater of claim 1, wherein the service-area repeater further comprises uplink circuitry configured to receive, via the coverage antenna, radio frequency uplink signals from user equipment in the service area, wherein the uplink circuitry is further configured to wirelessly transmit uplink signals via the donor antenna to the base station.

4. The service-area repeater of claim 3, wherein the uplink circuitry comprises a second signal transformation circuit configured to transform the received radio frequency uplink signals to generate transformed uplink signals, wherein the uplink circuitry further comprises a second frequency correction circuit configured to apply the frequency correction to the transformed uplink signals to generate corrected transformed uplink signals, wherein the uplink circuitry is further configured to wirelessly transmit the corrected transformed uplink signals via the donor antenna to the base station.

5. The service-area repeater of claim 4, wherein the first signal transformation circuit and the second signal transformation circuit are the same circuit.

6. The service-area repeater of claim 4, wherein the first frequency correction circuit and the second frequency correction circuit are the same circuit.

7. The service-area repeater of claim 3, wherein the downlink circuitry further comprises a first frequency shifting circuit configured to shift a frequency of the downlink signals to a supported frequency band of the user equipment, wherein the uplink circuitry further comprises a second frequency shifting circuit configured to shift a frequency of the uplink signals to outside a supported frequency band of the user equipment.

8. The service-area repeater of claim 3, wherein the uplink circuitry further comprises an uplink muting circuit configured to selectively mute a band, channel, and/or time-slot of the received radio frequency uplink signals.

9. The service-area repeater of claim 1, wherein the received transformed radio frequency downlink signals are inverted radio frequency downlink signals, wherein the first signal transformation circuit is a first signal inversion circuit configured to de-invert a spectrum of the received transformed radio frequency downlink signals in order to generate downlink signals that are not inverted.

10. The service-area repeater of claim 9, wherein the first signal transformation circuit is configured to de-invert the spectrum of the received inverted radio frequency downlink signals by:
    downconverting the inverted radio frequency downlink signals to an inverted complex baseband signal having an in-phase component and a quadrature component;
    swapping the in-phase component and the quadrature component of the inverted complex baseband signal to generate a non-inverted complex baseband signal; and
    upconverting the non-inverted complex baseband signal to generate the downlink signals that are not inverted.

11. The service-area repeater of claim 9, wherein the first signal inversion circuit is configured to de-invert the spectrum of the received inverted radio frequency downlink signals by:
    downconverting the inverted radio frequency downlink signals to an inverted complex baseband signal having an in-phase component and a quadrature component;
    inverting the in-phase component or the quadrature component of the inverted complex baseband signal to generate a non-inverted complex baseband signal; and
    upconverting the non-inverted complex baseband signal to generate the downlink signals that are not inverted.

12. The service-area repeater of claim 9, wherein the first signal inversion circuit is configured to de-invert the spectrum of the received inverted radio frequency downlink signals by:
    downconverting the inverted radio frequency downlink signals using a high-side local oscillator injection in order to generate a frequency inverted lower sideband; and
    converting the frequency inverted lower sideband to radio frequency in order to generate the downlink signals that are not inverted.

13. The service-area repeater of claim 1, wherein the first frequency correction circuit is configured to determine the frequency correction by:
    correlating the received transformed radio frequency downlink signals against a known pattern that is transmitted in the received signal;
    multiplying the known pattern by a complex conjugate of the correlated pattern in the received signal;
    measuring a phase change of the resulting product; and
    dividing by a duration of the known pattern to calculate a frequency difference between the known pattern and the received signal.

14. The service-area repeater of claim 1, wherein the transformed radio frequency downlink signals are modulated using differential quadrature phase shift keying, wherein the first frequency correction circuit is configured to determine the frequency correction by determining a rotation rate of a constellation of the received transformed radio frequency downlink signals.

15. The service-area repeater of claim 1, wherein the first frequency correction circuit is configured to determine the frequency correction by determining a carrier frequency offset using a synchronization burst of a Terrestrial Trunked Radio (TETRA) signal.

16. A base-station repeater for deployment with a base station configured to supply capacity for serving a service area that is located remotely from the base station and the base-station repeater, the base-station repeater comprising:
    downlink circuitry configured to receive downlink signals from the base station;
    wherein the downlink circuitry comprises a first signal transformation circuit configured to transform the received downlink signals in order to generate transformed downlink signals that do not comply with a mobile standard; and wherein the downlink circuitry is further configured to wirelessly transmit the transformed downlink signals via one or more base station antennas to a service-area repeater located in the service area, wherein the transformed downlink signals that are wirelessly transmitted via the one or more base station antennas cannot be detected by any user equipment in a coverage area of the one or more base station antennas but not in the service area that includes the service-area repeater.

17. The base-station repeater of claim 16, wherein the first signal transformation circuit is configured to transform the received downlink signals by inverting a spectrum of the received downlink signals.

18. The base-station repeater of claim 16, wherein the downlink signals received from the base station are digital downlink signals.

19. The base-station repeater of claim 16, wherein the downlink signals received from the base station are radio frequency downlink signals.

20. The base-station repeater of claim 19, wherein the first signal transformation circuit is configured to generate the transformed downlink signals by:

downconverting the received radio frequency downlink signals to a complex baseband signal having an in-phase component and a quadrature component;

swapping the in-phase component and the quadrature component of the complex baseband signal to generate an inverted complex baseband signal; and upconverting the inverted complex baseband signal to generate inverted downlink signals.

21. The base-station repeater of claim 19, wherein the first signal transformation circuit is configured to generate the transformed downlink signals by:

downconverting the received radio frequency downlink signals to a complex baseband signal having an in-phase component and a quadrature component;

inverting the in-phase component or the quadrature component of the complex baseband signal to generate an inverted complex baseband signal; and upconverting the inverted complex baseband signal to generate inverted downlink signals.

22. The base-station repeater of claim 19, wherein the first signal transformation circuit is configured to generate the transformed downlink signals by:

downconverting the received radio frequency downlink signals using a high-side local oscillator injection to generate a frequency inverted lower sideband; and converting the frequency inverted lower sideband to a radio frequency signal to generate inverted downlink signals.

23. The base-station repeater of claim 16, further comprising uplink circuitry configured to receive, via the one or more base station antennas, radio frequency uplink signals, wherein the uplink circuitry is further configured to transmit uplink signals derived from the radio frequency uplink signals to the base station.

24. The base-station repeater of claim 23, wherein the uplink circuitry is configured to receive transformed radio frequency uplink signals, wherein the uplink circuitry comprises a second signal transformation circuit configured to de-transform the received transformed radio frequency uplink signals in order to generate uplink signals that are not transformed.

25. The base-station repeater of claim 23, wherein the downlink circuitry further comprises a first frequency shifting circuit configured to shift a frequency of the downlink signals to outside a supported frequency band of the user equipment, wherein the uplink circuitry further comprises a second frequency shifting circuit configured to shift a frequency of the received uplink signals to a supported frequency band of the user equipment.

26. A base station configured to supply capacity for serving a service area that is located remotely from the base station, the base station comprising:

downlink circuitry configured to generate downlink signals;

the downlink circuitry further comprising a first signal transformation circuit configured to transform the downlink signals to generate transformed downlink signals that do not comply with a mobile standard; and wherein the downlink circuitry is configured to wirelessly transmit the transformed downlink signals via one or more antennas to a service-area repeater in the service area, wherein the transformed downlink signals that are wirelessly transmitted via the one or more antennas cannot be detected by any user equipment in a coverage area of the one or more antennas but not in the service area that includes the service-area repeater.

27. The base station of claim 26, wherein the first signal transformation circuit is configured to transform the downlink signals by inverting a spectrum of the downlink signals.

28. The base station of claim 26, wherein the base station comprises a Terrestrial Trunked Radio (TETRA) base station.

29. The base station of claim 26, wherein the one or more antennas are tilted upward away from the ground.

30. The base station of claim 26, wherein the first signal transformation circuit is configured to generate the transformed downlink signals by:

swapping an in-phase component and a quadrature component of a complex baseband signal to generate an inverted complex baseband signal; and upconverting the inverted complex baseband signal to generate inverted radio frequency downlink signals.

31. The base station of claim 26, wherein the first signal transformation circuit is configured to generate the transformed downlink signals by:

inverting an in-phase component or a quadrature component of a complex baseband signal to generate an inverted complex baseband signal; and upconverting the inverted complex baseband signal to generate inverted radio frequency downlink signals.

32. The base station of claim 26, wherein the base station comprises a plurality of uplink receivers configured to receive radio frequency uplink signals from user equipment inside a plurality of buildings.

33. The base station of claim 26, further comprising uplink circuitry configured to receive, via the one or more antennas, radio frequency uplink signals.

34. The base station of claim 33, wherein the uplink circuitry is configured to receive transformed radio frequency uplink signals, wherein the uplink circuitry comprises a second signal transformation circuit configured to de-transform the received transformed radio frequency uplink signals in order to generate uplink signals that are not transformed.

35. The base station of claim 34, wherein the downlink circuitry further comprises a first frequency shifting circuit configured to shift a frequency of the transformed downlink signals, wherein the uplink circuitry further comprises a second frequency shifting circuit configured to shift a frequency of the received uplink signals.

36. The base station of claim 35, wherein the first frequency shifting circuit is configured to shift the frequency of the transformed downlink signals to outside a supported frequency band of user equipment, wherein the second frequency shifting circuit is configured to shift the frequency of the received uplink signals to a supported frequency band of the user equipment.

* * * * *